May 17, 1949.　　　　S. C. EWING　　　　2,470,478
SYNCHRONOUS MOTOR CONTROL SYSTEM
Filed June 11, 1948
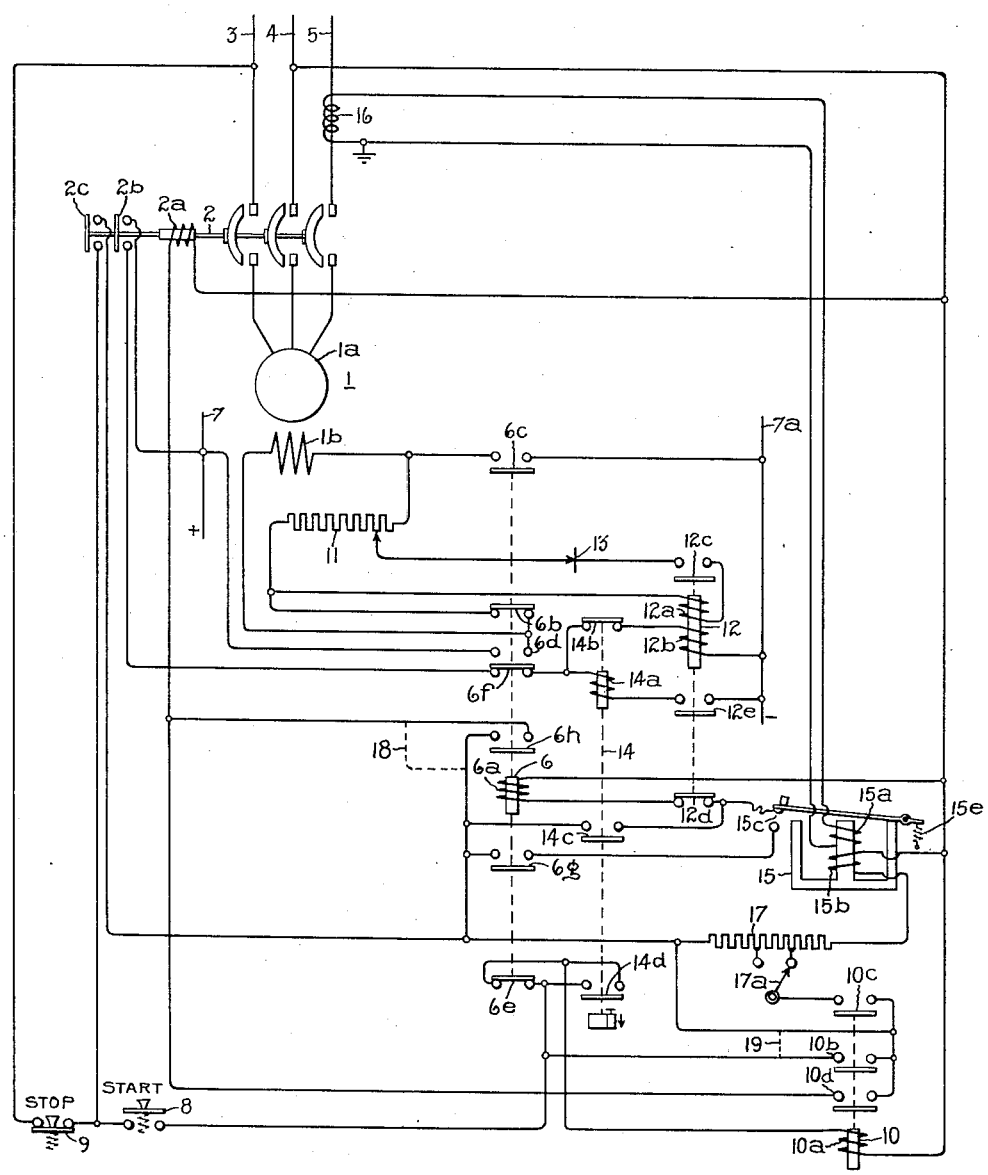
Inventor:
Samuel C. Ewing,
by Claude H. Mott
His Attorney.

Patented May 17, 1949

2,470,478

UNITED STATES PATENT OFFICE 2,470,478

SYNCHRONOUS MOTOR CONTROL SYSTEM

Samuel C. Ewing, Scotia, N. Y., assignor to General Electric Company, a corporation of New York Application June 11, 1948, Serial No. 32,287

2 Claims. (Cl. 318—176)

This invention relates to control systems, more particularly to control systems for synchronous motors, and it has for an object the provision of a simple, reliable and improved control system of this character.

Another object of the invention is an improved control system for applying field to a synchronous machine at a predetermined subsynchronous speed of the machine.

A still further object of the invention is the provision of a synchronous motor control system in which the number of control devices for carrying out the control operations is reduced to a minimum.

In carrying the invention into effect, in one form thereof, a contactor is provided for controlling the connection of the field winding of a synchronous motor to a source of D.-C. supply and a line contactor is provided for connecting the armature winding to a source of A.-C. supply. A field relay is provided for controlling the energization of the field contactor. It has two coils mounted on its core structure. One coil is a closing coil and the other is energized from the slip frequency voltage induced in the field winding during operation of the motor at subsynchronous speed and controls the drop-out operation of the field relay after the closing coil has been deenergized. The deenergization of the closing coil to transfer the control of the synchronizing sequence to the drop-out coil is effected by means of an auxiliary relay in response to closing of the line contactor. At a predetermined speed of the motor near synchronism, the drop-out coil control permits the field relay to drop out and energize the field contactor. The field relay is interlocked with the auxiliary relay to provide for deenergization of the auxiliary relay in response to drop-out of the field relay. The auxiliary relay has time delay drop-out, and during its timing period it prevents reenergization of the closing coil of the field relay.

For a better and more complete understanding of the invention, reference should now be had to the following specification and to the accompanying drawing of which the single figure is a simple diagrammatic sketch of an embodiment of the invention.

Referring now to the drawing, the armature $1a$ of a synchronous motor $1$ is arranged to be connected by means of a contactor $2$ to a suitable source of alternating voltage which is represented by the three supply conductors $3$, $4$ and $5$. The field winding $1b$ of the motor is arranged to be connected by means of a suitable switching device, such as the field contactor $6$, to a suitable source of substantially constant direct voltage which is represented by the two supply lines $7$ and $7a$.

For the purpose of opening and closing the line switch contactor $2$, suitable "start" and "stop" switching devices $8$ and $9$ are provided. The start device $8$ is illustrated as a push button type switch having normally open contacts and the stop device $9$ is illustrated as a push button type switch having normally closed contacts. The normally closed contacts of the start switch $8$ are connected in the operating coil circuit of an auxiliary relay $10$, and the normally closed contacts of the stop switch $9$ are connected in the operating coil circuits of the line contactor $2$ and the auxiliary relay $10$.

A discharge resistor $11$ is provided for the field winding. It is connected across the winding by the normally closed contacts $6b$ of the field contactor $6$. The normally open contacts $6c$ and $6d$ serve to connect the field winding $1b$ to the source $7$, $7a$ when the field contactor is picked up.

A suitable speed responsive means is provided for controlling the energization of the operating coil $6a$ of the field contactor when the motor attains substantially synchronous speed. This means is illustrated as comprising a relay $12$ of which one of its operating coils $12a$ is connected to the motor field circuit through a rectifier $13$. Although the rectifying device may be of any suitable type, it is preferably of the surface contact or metallic type such as the well known copper oxide rectifier or the selenium rectifier. The rectifier and the operating coil $12a$ are connected in series across any selected portion or all of the discharge resistor $11$.

The field relay is also provided with a second winding $12b$ which is connected across the D.-C. excitation source when the line contactor closes. The resulting energization of coil $12b$ picks up the field relay to close its normally open contacts $12c$ to connect the winding $12a$ across the resistor $11$. The rectifier $13$ is poled to rectify the negative half cycles of the alternating voltage across the resistor $11$. With this arrangement the induced current which flows in the circuit of the operating coil $12a$ maintains the relay picked up and its contacts $12d$ open until the motor attains a speed which is a few per cent below synchronous speed, e. g. 1 to 5 per cent slip. At this speed the frequency of the induced voltage is so low that the portion of each slip cycle during which the rectifier permits substantially no current to flow through the relay drop-out control winding 12a is sufficiently long to allow the relay to become demagnetized and to drop out and close its normally closed contacts 12d.

A relay 14 having instantaneous pick up and time delay drop-out cooperates with the field relay 12 to control the sequence of steps in the synchronizing operation. In this connection it responds to the closing of the line contactor 2 to open the circuit of the closing coil 12b of the field relay 12 to transfer control of the remainder of the synchronizing operation to the drop-out control coil 12a. Also it responds to the drop-out of the field relay 12 to prevent its reenergization for a predetermined interval of time after the drop-out.

For the purpose of deenergizing the field winding 1b in the event the motor pulls out of synchronism, a pull-out relay 15 is provided. This pull-out relay is preferably a power factor relay. It has a current coil 15a which is connected to the secondary winding of a current transformer 16 of which the primary winding is energized by the current flowing in one of the phases of the armature of the motor. It also has a voltage coil 15b which is connected through a resistor 17, the contacts 10b of the auxiliary relay 10, and the contacts of the start switch 8 and the stop switch 9 across the remaining two phases of the A.-C. supply. The relay 15 is provided with normally open contacts which are connected in the circuit of the operating coil 6a of the field contactor.

The relay is provided with an E-shaped core structure and with an armature member which is biased to the drop-out position by means of a spring 15e. The voltage coil and the current coil are both mounted on the same leg of the E-shaped core structure and preferably on the center leg. If the magnetomotive forces of the two coils are in phase and tending to send flux in the same direction, and further if the voltage and current being supplied to the motor have sufficient magnitudes, the relay will pick up and close its contacts. As the phase angle between these magnetomotive forces changes owing to a change in the phase angle between the current in the coil 15a and the current in the coil 15b the magnetomotive forces tend to buck each other and the relay will trip at a phase angle of the motor voltage and current which is indicative of the motor having pulled out of synchronism.

The relay 10 is provided with normally open contacts 10c which, when closed, short-circuit a large portion of the resistor 17 in circuit with the voltage coil of the pull-out relay. The portion of the resistor 17 that is short-circuited may be varied by means of a selector switch 17a. Preferably a portion is selected which will result in twice normal current in the coil circuit when the selected portion is short-circuited. This will result in the voltage coil overwhelming the current coil and picking up the relay irrespective of the power factor angle between the voltage and current of the motor.

With the foregoing understanding of elements and their organization, the operation of the system will readily be understood from the following detailed description.

The starting operation is initiated by pressing the "start" switch 8 to complete an energizing circuit for the operating coil 10a of the auxiliary relay 10. In response to energization, relay 10 picks up and closes its normally open contacts 10b, 10c and 10d. Contacts 10c in closing short-circuit two sections of the resistor 17. Contacts 10b and 10d complete an energizing circuit for the operating coil 2a of the line contactor. This circuit is traced from the A.-C. supply conductor 3, through the stop and start switches 9 and 8, contacts 10b and 10d and operating coil 2a to conductor 4. Responsively to energization, the line contactor closes its main contacts to connect the armature winding of the motor to the A.-C. supply conductors 3, 4 and 5. It also closes its interlock contacts 2b and 2c. In closing, contacts 2c complete a sealing-in circuit for the line-contactor in parallel with the contacts 10b and the contacts of the start switch 8 which may now be released. A sealing-in circuit is also provided for operating coil of auxiliary relay 10 which extends from conductor 3 through stop switch 9, contacts 2c of the line switch, contacts 12b of the auxiliary relay, contacts 6e of the field contactor and coil 10a of the auxiliary relay to conductor 4. The closing of interlock contacts 2c of the line switch completes an energizing circuit for the voltage coil 15b of the pull-out relay 15. It is traced from supply conductor 4 through coil 15b, the right-hand section of resistor 17, contacts 10c, contacts 2c of the line switch and contacts of the stop switch 9 to supply conductor 3. Since a large portion of resistor 17 is short-circuited, the voltage coil 15b is so strongly energized that it causes relay 15 to pick up and close its contacts 15c.

In closing, contacts 2b of the line switch complete an energizing circuit for the closing coil of the field relay which extends from the positive conductor 7 through contacts 2b, 6f and 14b through coil 12b to negative conductor 7a. The field relay 12 picks up in response to energization and closes its normally open contacts 12c and 12e and opens its normally closed contacts 12d.

Contacts 12c, in closing, complete an energizing circuit for the drop-out control coil 12a across a portion of the discharge resistor 11.

Since the line contactor 2 is closed, the stator winding 1a of the motor is connected to the A.-C. supply source, the motor accelerates as a squirrel cage motor, and an alternating voltage of slip frequency is induced in the field winding 1b and appears across the discharge resistor 11 to which the field winding is connected through normally closed contacts 6b of the field contactor. Owing to the presence of the rectifier 13 in the circuit of coil 12a, a half wave current flows in the coil 12a.

In their closed position, the contacts 12e complete an energizing circuit for the operating coil 14a of the time delay auxiliary relay 14 which picks up without time delay in response to energization to open its normally closed contacts 14b and to close its normally open contacts 14c and 14d. In opening, contacts 14b interrupt the energizing circuit of the closing coil of the field relay which, however, remains held in as a result of the energization of the drop-out control coil 12a by the rectified current impulses supplied from the field circuit. Thus control of the remainder of the synchronizing operation is transferred from the closing coil to the drop-out control coil.

Contacts 14c, in closing, complete a circuit in parallel with interlock contacts 6g of the field contactor and contacts 15c of the pull-out relay. Similarly contacts 14d complete a circuit in parallel with contacts 6e.

As the motor continues to accelerate, the slip frequency of the half wave voltage supplied to the drop-out control coil decreases from 60 cycles (for a 60 cycle machine) at the start to a low frequency, e. g. the frequency corresponding to two per cent slip. At this frequency the interval between successive current impulses is so great that the drop-out coil 12a becomes deenergized for a time sufficient to enable the relay to drop out and close its normally closed contacts 12d and open its normally open contacts 12c and 12e. Contacts 12c in opening interrupt the circuit of the drop-out coil 12a of the field relay. Contacts 12e, in opening, interrupt the circuit of coil 14a of the time delay auxiliary relay which begins to time out in response to deenergization.

The closing of contacts 12d completes an energizing circuit for the operating coil 6a of the field contactor 6. This circuit is traced from the supply conductor 4, through coil 6a, closed contacts 12d, contacts 14c of the time delay relay which has not yet timed out, interlock contacts 2c of the line switch, contacts of stop switch to conductor 3. Responsively to energization, the field contactor 6 picks up and opens its normally closed contacts and closes its normally open contacts. Contacts 6b in opening disconnect the field winding 1b from the discharge resistor 11 and contacts 6c and 6d in closing connect the field winding 1b to the excitation source supply conductors 7 and 7a. Contacts 6g, in their closed position, complete a sealing-in circuit for the coil 6a through contacts 15c of the pull-out relay 15 to maintain the coil 6a of the field contactor 6 energized after the auxiliary relay 14 times out and opens its contacts 14c.

The application of field to the motor usually results in the motor pulling into synchronism. Immediately following the application of field there is a possibility of momentary surges and unstable operation in which the power factor changes abruptly and erratically and in which the pull-out relay 15 would remove field from the motor if it were permitted to do so. It is desirable not to remove field immediately after application of field because instabilities in the switching operation will usually disappear and the motor will settle down to operation at unity or leading power factor within a short period.

At the end of this period, the time delay auxiliary relay 14 has timed out and closed its contacts 14b and opened its contacts 14c and 14d. Contacts 14d in opening interrupt the energizing circuit for the operating coil of auxiliary relay 10, which drops out to open all its contacts. Contacts 10c, in opening, insert all of resistor 17 in circuit with the voltage coil of the pull-out relay.

If stable operation has resulted, the opening of contacts 14c of time delay relay does not drop out the field contactor 6 which remains picked up through the contacts 15c of the pull-out relay 15. However, if stable operation has not resulted, or if at any subsequent time in its operation the motor pulls out of synchronism, the power factor of the voltage and current supplied to the motor becomes sufficiently less than unity to permit the power factor relay 15 to drop out and open its contacts 15c thereby to interrupt the energizing circuit for the operating coil 6a of the field contactor. Responsively to deenergization the field contactor 6 drops out and disconnects the field winding 1b from the excitation source and reconnects it to the discharge resistor 11. Interlock contacts 6h of the field contactor, in opening, interrupt the operating coil circuit of the line contactor which drops out in response to deenergization to disconnect the stator winding of the motor from the A.-C. source thereby to have the system in a reset condition for starting in response to depression of the start switch.

If automatic resynchronizing operation is desired, the jumpers 18 and 19 shown in dotted lines may be provided. The jumper 18 parallels the contacts 6h of the field contactor 6 and the jumper 19 parallels the contacts 10b of the auxiliary relay 10.

Consequently when the field contactor drops out and opens contacts 6h, the operating coil circuit of the line contactor is not interrupted but remains completed through the jumper 18. In its dropped out position the field contactor closes its interlock contacts 6e to complete an energizing circuit for the operating coil 10a of the auxiliary relay which extends from the left hand contact of the start switch through interlock contacts 2c of the line switch, jumper 19, contacts 6e of the field contactor, and operating coil 10a of the auxiliary relay which responds and closes its contacts. From this point on the operation is the same as described in the foregoing following the energization of the auxiliary relay 10 in response to depression of the start switch 8.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In combination, a synchronous motor having field and armature windings, a source of D.-C. excitation, means for connecting said field winding to said source comprising a field contactor provided with an operating coil, means for controlling said contactor comprising a field relay provided with a closing coil, a drop-out control coil, a contact for connecting said drop-out coil to the field circuit of said motor and with a contact in the coil circuit of said contactor, a starting switching device, a source of alternating voltage, a line contactor responsive to operation of said switching device for connecting said armature winding to said alternating source and provided with an interlock contact for energizing said closing coil to cause said field relay to pick up and connect said drop-out control coil to said field circuit, an auxiliary relay responsive to operation of said field relay for deenergizing said closing coil thereby to transfer control of said field relay to said drop-out coil, a rectifier in circuit with said drop-out coil for supplying unidirectional current pulses to said drop-out coil to effect drop-out of said field relay in response to a predetermined duration of interval between successive impulses, and a normally closed contact on said field relay in the coil circuit of said field contactor for closing said field contactor to connect said field winding to said D.-C. source in response to drop-out of said field relay.

2. In combination, a synchronous motor having an armature and a field winding, a source of D.-C. excitation, a field contactor provided with an operating coil and with contacts for connecting said field winding to said source, control means for said contactor comprising a field relay provided with a closing coil, a drop-out control coil, a contact for connecting said drop-out coil to the field circuit of said motor and with a normally closed contact in the coil circuit of said contactor, a source of alternating voltage, a starting switching device, a line contactor responsive to operation of said starting switching device for connecting said armature winding to said source of alternating voltage and provided with an interlock contact for completing an energizing circuit for said closing coil to cause said relay to connect said drop-out control coil to said field circuit, an auxiliary time delay relay responsive to said circuit completing operation of said field relay for deenergizing said closing coil thereby to transfer control of said field relay to said drop-out coil, a rectifier in circuit with said drop-out coil for supplying unidirectional current impulses to said drop-out coil during operation of said motor at subsynchronous speed thereby to effect drop-out of said field relay and closing of said field contactor to connect said field winding to said D.-C. source in response to a predetermined duration of interval between successive current impulses and a normally open contact on said field relay in the coil circuit of said auxiliary relay to effect drop-out of said auxiliary relay to close said normally closed contact to prepare an energizing circuit for said closing coil a predetermined interval of time after the closing operation of said field contactor.

SAMUEL C. EWING.

No references cited.